(12) United States Patent
Prieto Rio et al.

(10) Patent No.: US 10,203,817 B2
(45) Date of Patent: Feb. 12, 2019

(54) METHOD FOR FORMING AN ELECTRODE STRUCTURE FOR A CAPACITIVE TOUCH SENSOR

(71) Applicant: M-SOLV LTD., Oxford Oxfordshire (GB)

(72) Inventors: Camilo Prieto Rio, Oxford (GB); Yuk Kwan Chan, Oxford (GB)

(73) Assignee: M-SOLV LTD., Oxford (GB)

( * ) Notice: Subject to any disclaimer, the term of this patent is extended or adjusted under 35 U.S.C. 154(b) by 597 days.

(21) Appl. No.: 14/769,431

(22) PCT Filed: Feb. 14, 2014

(86) PCT No.: PCT/GB2014/050439
§ 371 (c)(1),
(2) Date: Aug. 20, 2015

(87) PCT Pub. No.: WO2014/128440
PCT Pub. Date: Aug. 28, 2014

(65) Prior Publication Data
US 2016/0004349 A1    Jan. 7, 2016

(30) Foreign Application Priority Data

Feb. 21, 2013  (GB) .................................. 1303085.3

(51) Int. Cl.
*G06F 3/044* (2006.01)
*B23K 26/0622* (2014.01)
(Continued)

(52) U.S. Cl.
CPC ............ *G06F 3/044* (2013.01); *B23K 26/066* (2015.10); *B23K 26/0624* (2015.10);
(Continued)

(58) Field of Classification Search
CPC ........... G06F 3/044; G06F 2203/04103; B23K 26/0624; B23K 26/066; B23K 26/40; B23K 2203/50
See application file for complete search history.

(56) References Cited

U.S. PATENT DOCUMENTS 6,249,371 B1    6/2001 Masuda et al.
6,706,998 B2    3/2004 Cutler
(Continued)

FOREIGN PATENT DOCUMENTS

CN    201380363 Y    1/2010
CN    201645056 U    11/2010
(Continued)

OTHER PUBLICATIONS

Second Office Action regarding Chinese Application No. 201480009362.5, dated Mar. 3, 2017. Translation provided by J.A. Kemp.
(Continued)

*Primary Examiner* — Peter DungBa Vo
*Assistant Examiner* — Jeffrey Carley
(74) *Attorney, Agent, or Firm* — Harness, Dickey & Pierce, P.L.C.

(57) ABSTRACT

A method of forming an electrode structure for a capacitive touch sensor in a transparent conductive layer located on a transparent non-conductive layer which is located on a color filter layer by a direct write laser scribing process using a pulsed solid state laser, the laser wavelength, pulse length and beam profile at the substrate being selected to have a wavelength in the range 257 nm to 266 nm, a pulse length in the range 50 fs to 50 ns, and a top hat beam profile having a uniformity of power or energy density between a value (Emax) and a minimum value (Emin) of less than 10%, where uniformity is defined as (Emax−Emin)/(Emax+Emin). 1 Grooves can thus be formed in the transparent
(Continued)

conductive layer to electrically isolate areas of the transparent conductive layer on opposite sides of each groove with substantially no damage to the transparent non-conductive layer or the color filter layer beneath the transparent conductive layer.

8 Claims, 6 Drawing Sheets

(51) Int. Cl.
  *B23K 26/066* (2014.01)
  *B23K 26/40* (2014.01)
  *B23K 26/364* (2014.01)
  *B23K 103/00* (2006.01)
(52) U.S. Cl.
  CPC ............ *B23K 26/364* (2015.10); *B23K 26/40* (2013.01); *B23K 2103/50* (2018.08); *G06F 2203/04103* (2013.01); *G06F 2203/04112* (2013.01)

(56) References Cited

U.S. PATENT DOCUMENTS

| | | | |
|---|---|---|---|
| 8,134,527 B2 | 3/2012 | Chien et al. | |
| 8,624,157 B2 * | 1/2014 | Albelo | B23K 26/386 219/121.72 |
| 8,648,277 B2 | 2/2014 | Alpay et al. | |
| 8,881,388 B2 | 11/2014 | Milne | |
| 2003/0132208 A1 | 7/2003 | Cutler | |
| 2005/0194365 A1 | 9/2005 | Li | |
| 2005/0274702 A1 * | 12/2005 | Deshi | B23K 26/0624 219/121.72 |
| 2006/0261924 A1 * | 11/2006 | Swenson | H01C 7/18 338/195 |
| 2007/0215581 A1 | 9/2007 | Kato et al. | |
| 2007/0272667 A1 * | 11/2007 | Lei | H05K 3/0035 219/121.71 |
| 2008/0053714 A1 * | 3/2008 | Ito | G06F 3/044 178/18.06 |
| 2009/0322702 A1 | 12/2009 | Chien et al. | |
| 2010/0200539 A1 | 8/2010 | Yun et al. | |
| 2011/0266264 A1 * | 11/2011 | Rumsby | B23K 26/06 219/121.72 |
| 2011/0285641 A1 | 11/2011 | Huang | |
| 2012/0113063 A1 | 5/2012 | Kim et al. | |
| 2012/0169664 A1 | 7/2012 | Milne | |
| 2012/0175235 A1 * | 7/2012 | Jiang | G06F 3/044 200/600 |
| 2012/0248075 A1 | 10/2012 | Alpay et al. | |
| 2012/0322240 A1 * | 12/2012 | Holden | B23K 26/0635 438/462 |
| 2013/0176267 A1 * | 7/2013 | Carley | G06F 3/044 345/174 |
| 2013/0192305 A1 * | 8/2013 | Black | C03B 33/0222 65/30.14 |
| 2013/0267076 A1 * | 10/2013 | Lei | H01L 21/78 438/460 |
| 2015/0375341 A1 * | 12/2015 | Chan | G06F 3/0412 264/400 |

FOREIGN PATENT DOCUMENTS

| | | |
|---|---|---|
| CN | 202736018 U | 2/2013 |
| EP | 2437317 A2 | 4/2012 |
| GB | 2472613 A | 2/2011 |
| GB | 2 487 962 A | 8/2012 |
| GB | 2511064 A | 8/2014 |
| JP | H0833993 A | 2/1996 |
| JP | H11258645 A | 9/1999 |
| JP | 2004344928 A | 12/2004 |
| JP | 2005532908 A | 11/2005 |
| JP | 2006114428 A | 4/2006 |
| JP | 2008091116 A | 4/2008 |
| JP | 2008264854 A | 11/2008 |
| JP | 2009-050868 A | 3/2009 |
| JP | 2012123744 A | 6/2012 |
| JP | 2012174578 A | 9/2012 |
| TW | 201000966 A | 1/2010 |
| TW | 201106240 A | 2/2011 |
| TW | 201142418 A | 12/2011 |
| TW | 201246388 A | 11/2012 |
| TW | 201246448 A | 11/2012 |
| WO | WO-2009114375 A2 | 9/2009 |
| WO | WO-2012107726 A1 | 8/2012 |

OTHER PUBLICATIONS

Raciukaitisa G., et al., "Patterning of ITO Layer on Glass with High Repetition Rate Picosecond Lasers" [online] Journal of Laser Micro/Nanoengineering vol. 2, No. 1, 2007.
Office Action regarding Taiwanese Patent Application No. 103105942, dated May 4, 2017. Translation provided by J A Kemp.
Search Report regarding Taiwanese Patent Application No. 103105942, dated May 1, 2017. Translation provided by J A Kemp.
Office Action regarding Japanese Patent Application No. 2015-558541, dated Oct. 31, 2017. Translation provided by J A Kemp.
Restriction Requirement regarding U.S. Appl. No. 14/769,412, dated Jan. 10, 2018.

* cited by examiner

Figure 11

METHOD FOR FORMING AN ELECTRODE STRUCTURE FOR A CAPACITIVE TOUCH SENSOR

CROSS REFERENCE TO RELATED APPLICATIONS

This application is a U.S. National Phase Application under 35 U.S.C. 371 of International Application No. PCT/GB2014/050439 filed on Feb. 14, 2014 and published as WO 2014/128440 A1 on Aug. 28, 2014. This application claims priority from British Application No. 1303085.3 filed on Feb. 21, 2013. The entire disclosures of all of the above applications are incorporated herein by reference.

FIELD OF THE INVENTION

This invention relates to a method of forming an electrode structure for a capacitive touch sensor and to apparatus for carrying out the method.

BACKGROUND ART

There is a requirement to incorporate capacitive touch sensors into devices such as smart phones, MP3 players, PDAs, tablets, Ultrabook PCs, AIO PCs, etc. Such devices generally have a front transparent cover that is made of glass or plastic onto the rear of which a transparent capacitive sensor is bonded. The capacitive sensor often consists of a substrate made from a transparent material such as plastic or glass on opposite sides of which transparent conductive (TC) materials such as indium tin oxide (ITO) are applied and patterned to form transmit electrode (Tx) and receive electrode (Rx) layers. Alternatively, a single layer sensor can be used which consists of one TC layer applied to the substrate which is suitably patterned and interconnected to form separately addressable Tx and Rx structures.

The cover/touch sensor assembly is attached to the display module which typically consists of a liquid crystal display (LCD). Such an arrangement leads to a cover/sensor/display module that is undesirably thick and heavy. To reduce the thickness and weight it is desirable to form the capacitive touch sensor directly on the cover or integrate the touch sensor into the LCD in some way.

Dual layer sensors that are integrated into LCDs can be of two types: "on-cell" type and "in-cell type". In the "on-cell" type, the sensor is formed on top of the LCD assembly. In the "in-cell" type, the Tx and Rx layers of the sensor are situated at various places within the LCD structure.

In one case, the Tx and Rx electrodes are formed in TC layers located on opposite sides of the glass substrate which carries the colour filter (CF) assembly and which forms the upper substrate of the LCD. The CF is made of stripes of organic RGB materials deposited within a black matrix (BM) structure and over-coated with an organic planarizing (OP) layer. The TC forming the Tx electrode is deposited on top of the OP layer on the CF and the TC forming the Rx electrode is deposited directly on the rear side of the glass substrate.

In another case, the Tx electrode is buried deeper in the LCD and formed in the TC layer that forms the lower electrode of the LCD in the same plane as the TFTs. In this case, the Rx electrode is formed in a TC layer on one or other of the two sides of the substrate carrying the CF.

For the case where the Tx electrode is situated on the CF substrate and forms the top electrode of the LCD, Tx patterning must be carried out before LCD assembly while patterning of the Rx electrode can take place either before or after LCD assembly. For the case where the Tx electrode is combined with the lower LCD electrode and the Rx electrode is on one or other side of the CF substrate, then this Rx layer can be patterned either before or after LCD assembly.

Hence, for in-cell dual layer sensors it is necessary to form a Tx or Rx electrode pattern in a TC layer situated on top of an organic passivation (OP) layer on top of an RGB CF structure on a glass substrate or to form an Rx electrode in a TC layer on a glass substrate with a CF structure located on the rear side.

In both cases, the usual method to form the electrode structures in the TC layers involves multi-step lithographic processes based on resist exposure and chemical etching of the TC. Such lithographic processes are complex and give rise to defects especially when carried out after the LCD has been assembled. It would be desirable to use laser ablation to form the electrode patterns in the TC layer but if standard laser arrangements are used there is a significant risk that the various CF, BM or OP layers below the TC will be damaged during the laser ablation process.

The present invention thus seeks to provide an improved method which enables laser ablation to be used to form an electrode structure in a TC layer situated on top of a transparent non-conductive layer and a colour filter layer without causing significant damage to any of the layers below the TC.

SUMMARY OF THE INVENTION

According to a first aspect of the invention, there is provided a method of forming an electrode structure for a capacitive touch sensor in a transparent conductive layer located on a transparent non-conductive layer which is located on a colour filter layer by a direct write laser scribing process using a pulsed solid state laser, the laser wavelength, pulse length and beam profile at the substrate being selected as follows:

i) a wavelength in the range 257 nm to 266 nm
ii) a pulse length in the range 50 fs to 50 ns
iii) a "top hat" beam profile having a uniformity of power or energy density between a maximum value (Emax) and a minimum value (Emin) of less than 10% where uniformity is defined as (Emax−Emin)/(Emax+Emin)

such that grooves are formed in the transparent conductive layer to electrically isolate areas of the transparent conductive layer on opposite sides of each groove with substantially no damage to the transparent non-conductive layer or the colour filter layer or black matrix array beneath the transparent conductive layer.

According to a second aspect of the invention, there is provided apparatus arranged to carry out a method as described above, the apparatus comprising a pulsed laser source arranged to direct write laser scribe an electrode structure for a capacitive touch sensor in a transparent conductive layer located on a transparent non-conductive layer which is located on a colour filter layer, using a pulsed solid state laser, the laser source being arranged to provide a wavelength, pulse length and beam profile at the substrate as follows:

i) a wavelength in the range 257 nm to 266 nm
ii) a pulse length in the range 50 fs to 50 ns
iii) a "top hat" energy density beam profile having a uniformity of power or energy density between a maximum value (Emax) and a minimum value (Emin) of less than 10% where uniformity is defined as (Emax−Emin)/(Emax+Emin).

The term 'top hat' is used to describe a beam profile that has a near uniform power or energy density across the entire beam (within the limits specified).

Other preferred and optional features of the invention will be apparent from the following description and the subsidiary claims of the specification.

BRIEF DESCRIPTION OF DRAWINGS

The invention will now be further described, merely by way of example, with reference to the accompanying drawings, in which.

DESCRIPTION OF PREFERRED EMBODIMENTS

Figure 1:
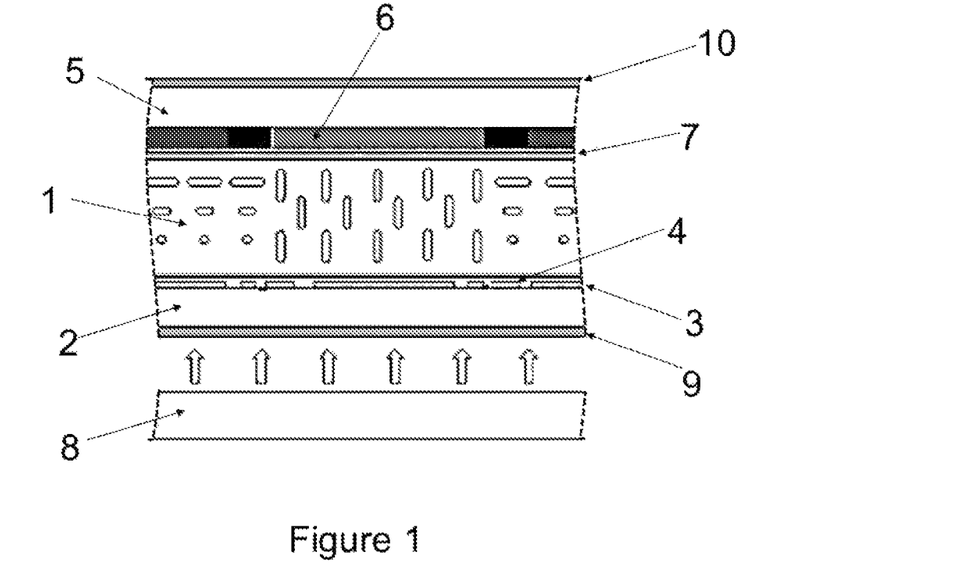
FIG. 1 is a sectional view of a known LCD and CF assembly.

FIG. 1 shows the construction of one type of known LCD/CF module. Liquid crystal material layer 1 is bounded on first (lower) side by a first glass substrate 2 which is coated with TFT devices 3 and a first TC layer 4 and, on second (upper) side, by a second glass substrate 5 coated with a CF layer 6 and second TC layer 7. Backlight unit 8 emits un-polarized light which passes through first polarizer sheet 9 and through all the layers comprising the LCD/CF module to emerge through a second polarizer 10. Several other LCD/CF module structures exist. It is possible for the CF layer to situated before the LCD layer, for example between the first polarizer and the backlight. It is also possible for the LCD structure to be inverted with the TFT layer on the upper side of the LCD with the CF layer situated above or below.

Figure 2:
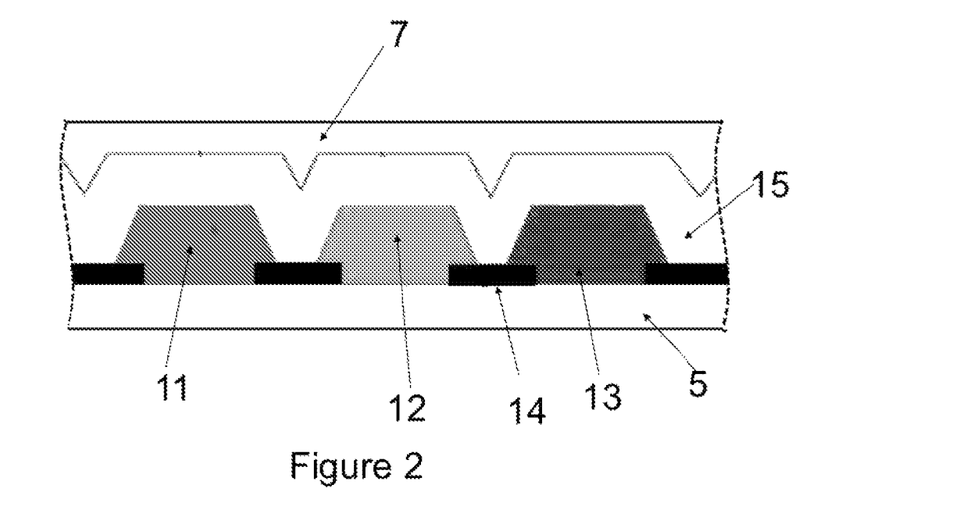
FIG. 2 is a sectional view of a known CF unit.

FIG. 2 shows details of a typical known CF and substrate. Glass substrate 5 has an RGB CF layer formed on a first side thereof. The CF layer consists of alternate stripes 11, 12 and 13 or a two-dimensional array of localized areas of RGB materials corresponding, respectively, to the lines of or individual pixels in an LCD. Stripes of RGB material are separated by areas of black matrix (BM) material 14 to improve viewing contrast. A multi-step lithographic process is typically used to form such RGB and BM structures.

A thin transparent non conducting organic planarizing (OP) layer 15 is applied to the RGB/BM layer to form a smooth upper surface. Polymethylmethacrylate (PMMA) or acrylic is typically used to form this layer. A TC layer 7 is deposited on top of the organic layer 15.

Figure 3:
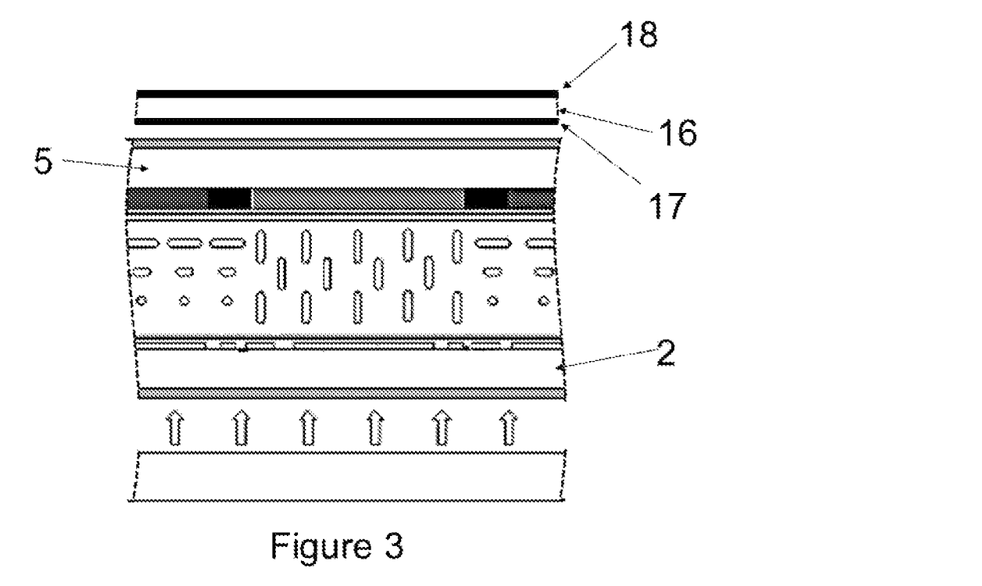
FIG. 3 is a sectional view of a known on-cell type of integrated touch panel/CF/LCD assembly.

FIG. 3 shows the construction of one type of known on-cell capacitive touch sensor module. Glass or transparent plastic substrate 16 has TC layers 17 and 18 deposited on opposite sides thereof. Lower TC layer 17 is patterned to form the sensor Tx layer and upper TC layer 18 is patterned to form the sensor Rx layer. The sensor assembly is then aligned to and attached to the LCD/CF module assembled between glass substrates 2 and 5.

Figure 4:
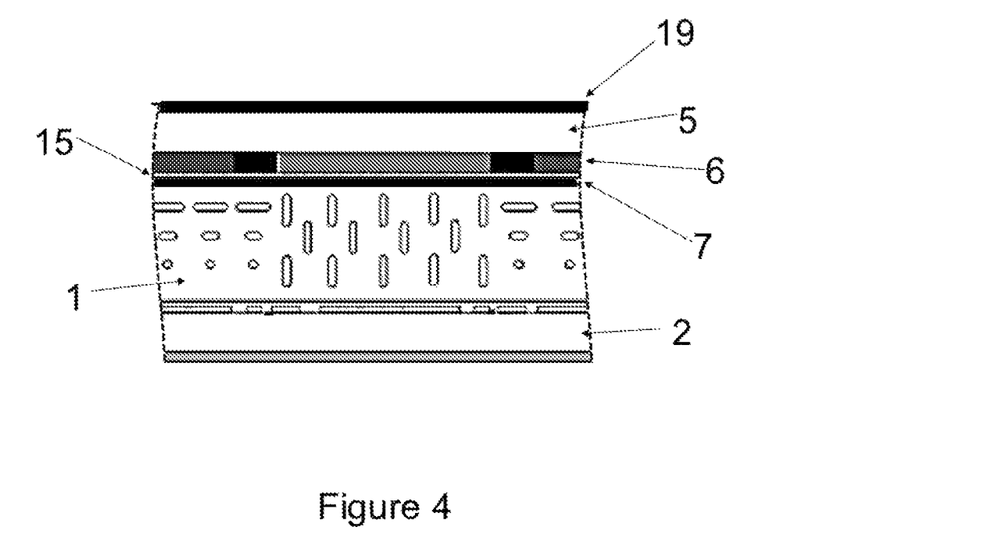
FIG. 4 is a sectional view of a known first type of in-cell integrated touch panel/CF/LCD assembly.

FIG. 4 shows the construction of one type of known in-cell capacitive touch sensor module. A first TC layer 7 covers an OP layer 15 provided on a CF layer 6 on a glass substrate 5 and, after suitable patterning, forms the sensor Tx layer. A second TC layer 19 is deposited on the rear side of the glass substrate 5 supporting the CF layer and, after suitable patterning, forms the Rx layer. The upper polarizer and backlight unit have been omitted from the figure.

The present invention relates to patterning the Tx layer of such a device by laser ablation. In the case of this particular in-cell sensor module structure, such laser patterning takes place before assembly of the LCD. After patterning of the Tx layer, the CF substrate 5 is aligned and attached to the lower LCD substrate 2 and the LCD filled with liquid material 1.

Figure 5:
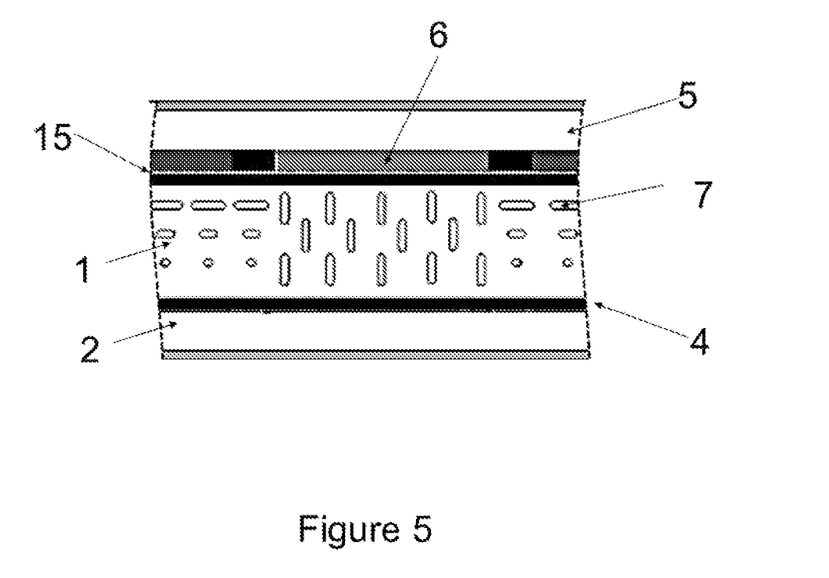
FIG. 5 is a sectional view of a known second type of in-cell integrated touch panel/CF/LCD assembly.

FIG. 5 shows the construction of a further type of in-cell capacitive touch sensor module. In this case, first TC layer 4 situated on the glass substrate 2 supporting the TFTs forms the sensor Tx layer and a second TC layer 7 covering the OP layer 15 on the CF layer 6 forms the sensor Rx layer. The upper polarizer and backlight unit have again been omitted from the figure.

The present invention also relates to the patterning of the Rx layer in such a device by laser ablation. In the case of this particular in-cell sensor module structure, such laser patterning takes place before assembly of the LCD. After patterning of the Rx layer, the CF substrate 5 is aligned and attached to the lower LCD substrate 2 and the LCD filled with liquid material 1.

Figure 6:
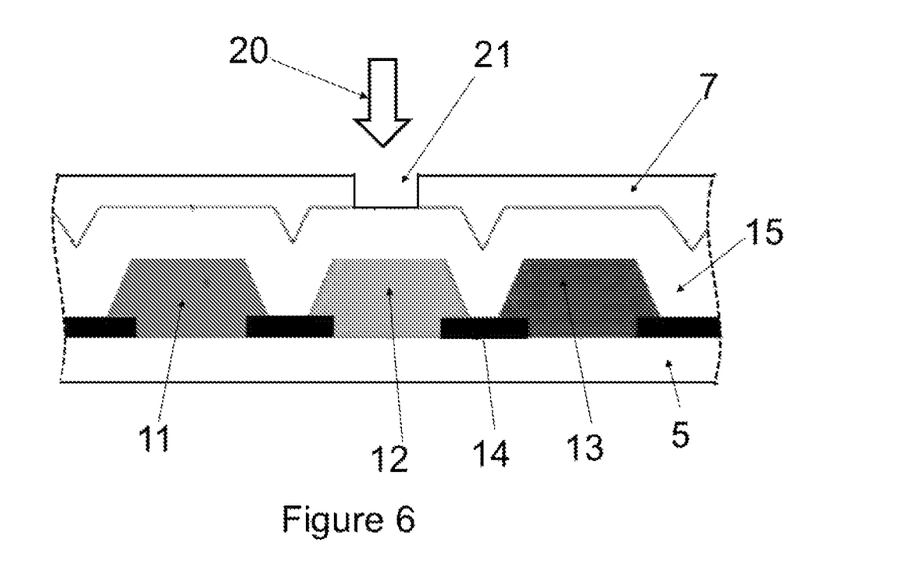
FIG. 6 illustrates formation of a groove for providing an electrode structure in a transparent conductive layer of an in-cell module (such as that shown in FIG. 4 or 5) by one embodiment of a method according to a first aspect of the invention.

FIG. 6 illustrates a preferred method according to a first aspect of the invention for forming a pattern in a TC layer 7 on top of an organic layer 15 on a CF layer. A pulsed laser beam 20 irradiates the surface of the TC layer 7 and is moved over the surface so as to remove material therefrom by laser ablation to form a pattern of grooves 21 in the TC layer 7. The laser beam 20 is arranged to remove all TC material in the grooves 21 so that there is no electrical conduction across the groove 21 but not to damage the organic layer 15 or the RGB materials 11, 12 and 13 or the BM material 14.

The laser used is of pulsed type emitting pulses having a duration less than 50 ns and preferably less than 50 ps. Laser operation is in the deep ultra-violet (DUV) range. Operation in the UV to IR regions (i.e. 351 nm to 1070 nm) is not desirable as the TC layer has minimal absorption and parts of the RGB CF have significant absorption at these wavelengths. The pulsed laser used may, for example, be selected from one of the following:

A laser operating at 266 nm with a nominal output pulse length of 10 ns

A laser operating at 266 nm with a nominal output pulse length of 15 ps

A laser operating at 263 nm with a nominal output pulse length of 10 ns

A laser operating at 262 nm with a nominal output pulse length of 150 fs

A laser operating at 257.5 nm with a nominal output pulse length of 10 ps.

It is found that UV, visible and IR lasers with a pulse length in the 0.5 ps to 200 ns range are not suitable as damage to the underlying CF materials occurs. However, if a shorter wavelength is used, i.e. 266 nm, 263 nm, 262 nm or 257.5 nm satisfactory results are achievable as the absorption in the TC layer is greater (so providing more protection for the underlying layers.

Shorter pulse lengths are generally preferred as the TC layer and the underlying organic layer can be very thin, e.g. 100 nm or less, so are susceptible to thermal damage. The shorter the pulse length, the shorter the time period in which heat energy from the laser pulse can diffuse into adjacent areas, particularly the underlying layers.

It will be appreciated that the laser wavelength and pulse length are selected such that the laser scribing process forms grooves in the transparent conductive layer that electrically isolate areas of the TC layer on opposite sides of each groove and that this needs to be done with substantially no damage to the transparent non-conductive layer or the colour filter layer beneath the TC layer. By this means, a series of grooves can be formed in TC layer to form an electrode structure therein. The grooves typically have a width in the range 5 to 30 μm though wider grooves are also possible.

This invention is directed towards the formation of an electrode structure in a transparent conductive (TC) layer by direct laser scribing where there is a danger of causing thermal damage to an underlying non-conductive layer and/or to an underlying colour filter layer. This danger arises when there is only a small difference between the pulse energy density required to ablate the TC layer and that which is likely to damage the underlying layers. In view of this small process 'window', the method includes the step of providing a beam with a top-hat profile as explained further below.

Figures 7A, 7B:
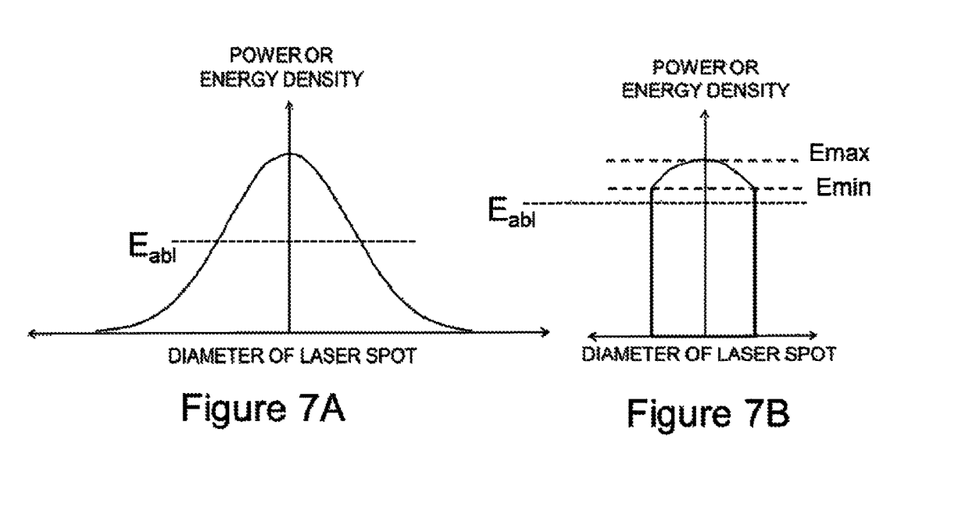
FIG. 7 illustrates the "top hat" beam profile provided at the surface of the transparent conductor in this method.

FIG. 7A shows a Gaussian beam intensity profile that generally occurs when a laser beam is brought to a focus and FIG. 7B shows a beam profile provided at the surface of the TC layer according to an embodiment of the invention. FIG. 7A plots the power density or energy density distribution that arises at the focal plane when a pulsed laser beam is focussed with a lens. In this case, there is a so called Gaussian distribution which has a peak power or energy density in the centre reducing to low values at the edges. Such a highly non-uniform beam profile is undesirable for two reasons: energy below the ablation threshold (Eabl) of the TC material is deposited as heat in the area around the focal spot causing thermal damage to the TC layer and the underlying layers and the peak energy density in the centre of the beam is well above the ablation threshold so significant energy can penetrate the TC layer causing damage to the layers below.

FIG. 7B shows the energy density distribution provided at the surface of the TC layer according to the first embodiment of this invention. In this case, a so called "top hat" distribution of power or energy density is used where most of the energy in the laser pulse is contained in a region above the ablation threshold energy density (Eabl). Ideally, the distribution would be truly top hat with no significant peak at the centre of the beam but, in practice, this is difficult to achieve so some variation in energy density over a range Emin to Emax is acceptable. Experiments have shown that a top hat beam profile having a uniformity of power or energy density uniformity over the central part of the beam of less than 10%, where uniformity is defined as (Emax−Emin)/(Emax+Emin), gives rise to effective and complete removal of the TC layer but without substantial damage to any underlying layers. Preferably, Emax does not exceed 1.3×Eabl, where Eabl is the threshold energy density for ablation of the TC layer.

Figure 8:
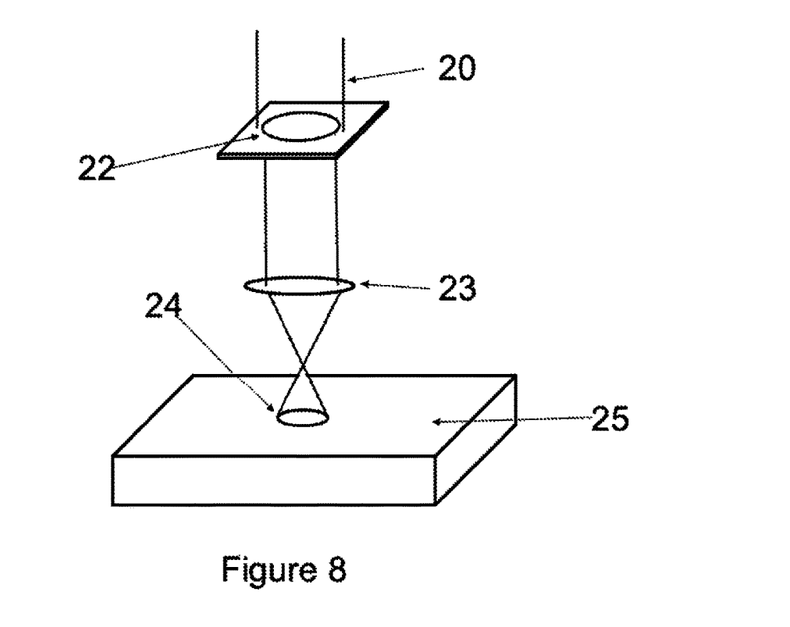
FIG. 8 shows a first method of forming a beam on the surface of the transparent conductive layer having such a "top hat" beam profile.

FIG. 8 shows one way of creating a top hat energy density distribution in the laser spot at the surface of the TC layer. Aperture 22 is placed in the laser beam 20 and lens 23 forms an image 24 of the aperture on the surface of the substrate 25 coated supporting the CF/BM, OP and TC layers. If the diameter of the aperture is substantially less than the diameter of the beam irradiating it then the low energy density portion of the beam will be removed and a beam profile of the type shown in FIG. 7B formed on the TC layer surface. Since the incident laser beam is generally round it is usual to use circular apertures and hence create circular spots on the TC surface.

Figure 9:
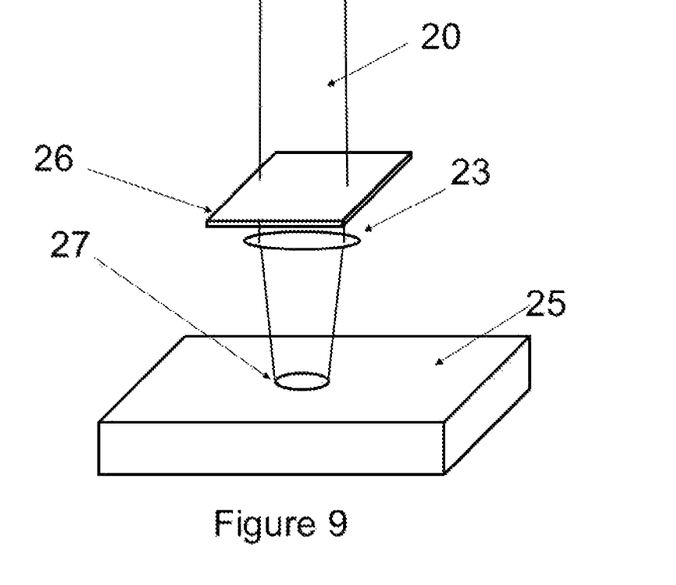
FIG. 9 shows a second method of forming a beam on the surface of the transparent conductive layer having such a "top hat" beam profile.

FIG. 9 shows another way of creating a top hat energy density distribution in the laser spot at the surface of the TC layer. Diffractive optical element (DOE) 26 situated in the laser beam 20 is designed such that it forms a top hat energy density distribution at the focal plane 27 of lens 23 which is located on the CF substrate 25. Such an arrangement has several advantages over the aperture imaging method shown in FIG. 8; it is much more efficient in use of laser pulse energy, it has a longer depth of focus and non-round (e.g. square) spots can be generated.

Figure 10:
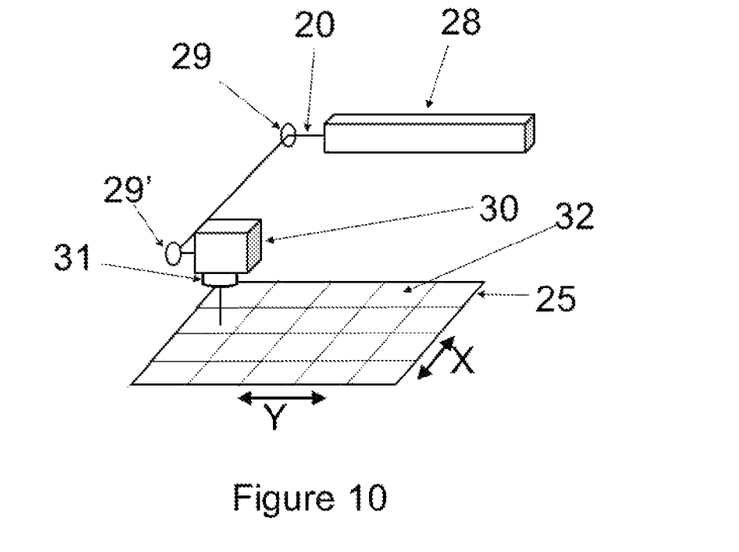
FIG. 10 is a schematic perspective view of a preferred embodiment of apparatus according to the second aspect of the invention for carrying out the method illustrated in FIG. 6.

FIG. 10 shows a schematic perspective view of one form of apparatus arranged to carry out the laser patterning process described above. Laser 28 emits laser beam 20 which is directed via mirrors 29, 29' to a two-dimensional scanner unit 30. The beam exiting the scanner is focussed by an f-theta lens 31 onto the surface of a substrate 25 which is mounted on stages such that it can be moved in directions X and Y. The substrate 25 is coated with an RGB CF layer, an organic layer and a top TC layer (as described above). With the substrate 25 stationary, the scanner 30 moves the beam over sub-areas 32 of the substrate 25 forming isolating grooves in the TC layer required to form the touch sensor electrode structure. After completion of each sub area 32, the substrate 25 is stepped to a new sub area 32 and the process repeated. This "step and scan" process is repeated until all of the substrate 25 has been patterned. Sub areas 32 can correspond to complete touch sensors for small devices (such as smart phones) or may form only part of larger touch sensors for larger devices (such as tablets and PCs). In the latter case, the sub-areas need to be 'stitched' together to form the electrode structure of the touch sensor.

Operation of the apparatus is preferably under the control of control means, such as a computer, which is arranged to control the laser and movement of the laser to carry out the scanning processes described.

The capacitive touch sensor laser patterning process described above can be performed on substrates which each contain one or more CF devices that are subsequently aligned to and attached to LCDs or, alternatively, the laser patterning can be performed on individual devices.

Figure 11:
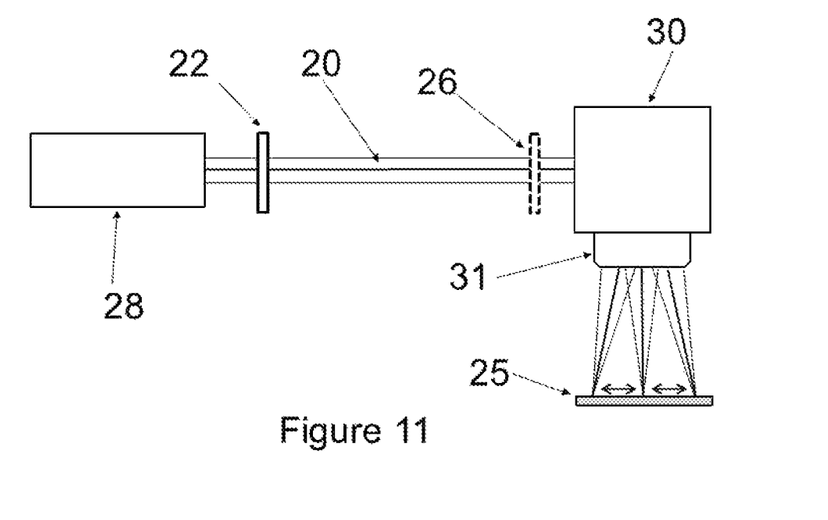
FIG. 11 shows ways of introducing top hat beam shaping as illustrated in FIGS. 9 and 10 into the apparatus of FIG. 11.

FIG. 11 shows how devices (e.g. an aperture or DOE) can be inserted into the laser beam path 20 to form a top hat energy distribution at the substrate. Pulsed laser 28 emits beam 20 which is deflected in 2 axes by scanner unit 30 and focussed by lens 31 onto the substrate 25. Aperture 22 is generally placed in the beam at some distance from lens 31 since the image of the aperture at the substrate is generally highly reduced in size so that the distance from lens 31 to the aperture 22 must be much longer than the distance from the lens 31 to the substrate 25. If a DOE 26 is used instead of an aperture to form the top hat beam profile then it is generally placed close to the lens 31 which in practice means just before scanner unit 30.

Key aspects of the process described above are:
1) Forming a pattern in a TC layer on top of a transparent non-conductive layer (which is typically an organic layer) on top of an LCD RGB/BM colour filter.
2) The pattern forms the Rx or Tx electrodes for a two layer capacitive touch sensor.
3) The TC layer is patterned to form the sensor electrode structure by direct write laser ablative scribing of narrow grooves.
4) The laser scribing process removes the TC material completely in the grooves but causes no (or minimal) damage to the underlying organic, RGB or BM layers.
5) The laser is of pulsed type operating in the DUV range and emitting pulses with duration less than 50 ns, and preferably less than 50 ps.
6) The beam profile at the surface of the TC layer has a "top hat" energy density beam profile with a uniformity of less than 10% where uniformity is defined as $(E_{max}-E_{min})/(E_{max}+E_{min})$ to avoid damaging the underlying layers.

The process thus enables a pattern to be formed in a single TC layer by laser scribing by selecting a laser beam having properties that enable it to ablate the TC layer in a single step with no or minimal damage to underlying organic, RGB or BM layers. In particular, in view of the narrow process window between these constraints, a top hat beam profile is used so that the most of the energy in the laser beam falls within this window, eg so that Emax does not exceed $1.3 \times E_{abl}$ as described above.

Such a process differs from known processes for forming electrode structures of a touch sensor. In particular, laser scribing has significant advantages over known lithographic methods. It is much more efficient: it can be carried out more quickly, it has a much better yield than a lithographic process and it can be adapted more easily. The above process thus provides considerable advantage over known lithographic methods for forming the electrode structures of an in-cell touch sensor.

In other forms of touch sensor, the transparent conductive layer is provided on a glass layer (or other layer which absorbs some of the laser energy). In such a situation, the method may not need to use a laser beam with a top-hat profile to avoid damaging the underlying layers as the glass layer provides some protection for the underlying layers. Such a method is the subject of co-pending patent application No. GB 1303074.7 (publication No. GB2511064A).

The invention claimed is:
1. A method of forming an electrode structure for a capacitive touch sensor in a transparent conductive layer located on a transparent non-conductive layer which is located on a colour filter layer, the method comprising forming the electrode structure by direct write laser scribing of the transparent conductive layer using a pulsed solid state laser, the laser wavelength, pulse length and beam profile at the transparent conductive layer being selected as follows:
   i) a wavelength in the range 257 nm to 266 nm
   ii) a pulse length in the range 50 fs to 50 ns
   iii) a top hat beam profile consisting of a central uniform region in which an energy density, defined as the energy per unit area provided by the laser, is everywhere above a threshold energy density for ablation of the transparent conductive layer and a region outside of the central uniform region where the energy density is below the threshold energy density for ablation of the transparent conductive layer, wherein the energy density in the central uniform region satisfies $(E_{max}-E_{min})/(E_{max}+E_{min})<10\%$, where Emax is a maximum energy density in the central uniform region and Emin is a minimum energy density in the central uniform region, whereby grooves are formed in the transparent conductive layer to electrically isolate areas of the transparent conductive layer on opposite sides of each groove with no damage to the transparent non-conductive layer or the colour filter layer beneath the transparent conductive layer.

2. The method as claimed in claim 1 in which the pulse length is 50 ps or less.

3. The method as claimed in claim 1 in which the laser wavelength is selected from one of the following: 257.5 nm or 266 nm.

4. The method as claimed in claim 1 in which Emax does not exceed $1.3 \times E_{abl}$, where Eabl is the threshold energy density for ablation of the transparent conductive layer.

5. The method as claimed in claim 1 in which the electrode structure comprises both transmit and receive electrode structures.

6. The method as claimed in claim 1 in which the touch sensor comprises a transparent substrate, the colour filter layer being provided on the transparent substrate, the transparent non-conductive layer forming a transparent planarizing layer over the colour filter layer and the transparent conducting layer provided over the planarizing layer.

7. The method as claimed in claim 2 in which Emax does not exceed $1.3 \times E_{abl}$, where Eabl is the threshold energy density for ablation of the transparent conductive layer.

8. The method as claimed in claim 3 in which Emax does not exceed $1.3 \times E_{abl}$, where Eabl is the threshold energy density for ablation of the transparent conductive layer.

\* \* \* \* \*